US011973598B2

(12) United States Patent
Hosseini et al.

(10) Patent No.: US 11,973,598 B2
(45) Date of Patent: Apr. 30, 2024

(54) ENHANCEMENTS FOR SIDELINK CARRIER AGGREGATION FEEDBACK

(71) Applicant: QUALCOMM Incorporated, San Diego, CA (US)

(72) Inventors: Seyedkianoush Hosseini, San Diego, CA (US); Ahmed Elshafie, San Diego, CA (US); Wei Yang, San Diego, CA (US); Alberto Rico Alvarino, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/392,181

(22) Filed: Aug. 2, 2021

(65) Prior Publication Data

US 2023/0036953 A1  Feb. 2, 2023

(51) Int. Cl.
*H04L 1/18* (2023.01)
*H04L 1/1812* (2023.01)
(Continued)

(52) U.S. Cl.
CPC .......... *H04L 1/1812* (2013.01); *H04L 5/0055* (2013.01); *H04W 72/044* (2013.01)

(58) Field of Classification Search
CPC ... H04L 1/1812; H04L 5/0055; H04L 5/0092; H04L 1/1614; H04L 5/001; H04L 1/1896
(Continued)

(56) References Cited

U.S. PATENT DOCUMENTS

2022/0201654 A1* 6/2022 Lee ................ H04L 1/1864
2022/0255680 A1* 8/2022 Moon ................ H04W 72/21

FOREIGN PATENT DOCUMENTS

| EP | 3985900 A1 | 4/2022 |
|---|---|---|
| WO | WO-2020210333 A1 | 10/2020 |
| WO | WO-2020251237 A1 | 12/2020 |

OTHER PUBLICATIONS

Intel Corporation: "Sidelink Physical Layer Procedures for NR V2X Communication", 3GPP TSG RAN WG1 Meeting #98bis, R1-1910653 Intel—EV2X_SL_L1_Procedure, 3rd Generation Partnership Project, Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019, XP051809173, 10 Pages, Figure 2, section 2.3.1.

(Continued)

*Primary Examiner* — Vinncelas Louis
(74) *Attorney, Agent, or Firm* — Norton Rose Fulbright US LLP

(57) ABSTRACT

This disclosure provides systems, methods, and devices for wireless communication that support enhanced sidelink carrier aggregation feedback operations. In a first aspect, a method of wireless communication includes receiving, by a wireless communication device, a sidelink shared channel transmission via a first component carrier. The method also includes obtaining, by the wireless communication device, a feedback resource indication. The method further includes transmitting, by the wireless communication device, a sidelink channel feedback transmission in a sidelink channel feedback transmission resource via a second component carrier different from the first component carrier. The sidelink channel feedback transmission resource is determined based on the feedback resource indication, and the sidelink channel feedback transmission indicates feedback data for the sidelink shared channel transmission. Other aspects and features are also claimed and described.

30 Claims, 10 Drawing Sheets

(51) Int. Cl.
*H04L 5/00* (2006.01)
*H04W 72/044* (2023.01)

(58) Field of Classification Search
CPC .. H04L 1/1861; H04L 1/1864; H04W 72/044; H04W 72/21
See application file for complete search history.

(56) References Cited

OTHER PUBLICATIONS

International Search Report and Written Opinion—PCT/US2022/072583—ISA/EPO—dated Sep. 9, 2022 (2106356WO).

\* cited by examiner

600

| Index | CA CC | Feedback CC | PRB Group |
|---|---|---|---|
| 1 | CC0 | CCX | 1 |
| 2 | CC1 | CCY | 2 |
| 3 | ... | ... | ... |
| 4 | CC8 | CCZ | 8 |

610

| Index | CA CC | Feedback CC | Starting PRB |
|---|---|---|---|
| 1 | CC0 | CCX | X PRB |
| 2 | CC1 | CCY | Y PRB |
| 3 | ... | ... | ... |
| 4 | CC8 | CCZ | Z PRB |

620

| Index | CA CCs | Feedback CC | Resource Pool |
|---|---|---|---|
| 1 | CC0, CC0 | CCX | X |
| 2 | CC0, CC1 | CCY | Y |
| 3 | ... | ... | ... |
| 4 | CC8, CC8 | CCZ | Z |

| CA CC | Feedback CC | Offset |
|---|---|---|
| CC0 | CCX | X PRBs |
| CC1 | CCY | Y PRBs |
| ... | ... | ... |
| CC8 | CCZ | Z PRBs |

710

| CA CCs | Feedback CC | Offset |
|---|---|---|
| CC0, CC0 | CCX | X PRBs |
| CC0, CC1 | CCY | Y PRBs |
| ... | ... | ... |
| CC8, CC8 | CCZ | Z PRBs |

*FIG. 7*

ENHANCEMENTS FOR SIDELINK CARRIER AGGREGATION FEEDBACK

TECHNICAL FIELD

Aspects of the present disclosure relate generally to wireless communication systems, and more particularly, to enhanced sidelink carrier aggregation feedback operations. Some features may enable and provide improved communications, including reduced collisions for sidelink carrier aggregation feedback operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, by a wireless communication device, a sidelink shared channel transmission via a first component carrier. The method also includes obtaining, by the wireless communication device, a feedback resource indication. The method further includes transmitting, by the wireless communication device, a sidelink channel feedback transmission in a sidelink channel feedback transmission resource via a second component carrier different from the first component carrier. The sidelink channel feedback transmission resource is determined based on the feedback resource indication, and the sidelink channel feedback transmission indicates feedback data for the sidelink shared channel transmission.

In an additional aspect of the disclosure, an apparatus includes at least one processor and a memory coupled to the at least one processor. The at least one processor is configured to receive a sidelink shared channel transmission via a first component carrier; obtain a feedback resource indication; and transmit a sidelink channel feedback transmission in a sidelink channel feedback transmission resource via a second component carrier different from the first component carrier, the sidelink channel feedback transmission resource determined based on the feedback resource indication, and the sidelink channel feedback transmission indicates feedback data for the sidelink shared channel transmission.

In an additional aspect of the disclosure, an apparatus includes means for receiving a sidelink shared channel transmission via a first component carrier; means for obtaining a feedback resource indication; and means for transmitting a sidelink channel feedback transmission in a sidelink channel feedback transmission resource via a second component carrier different from the first component carrier, the sidelink channel feedback transmission resource determined based on the feedback resource indication, and the sidelink channel feedback transmission indicates feedback data for the sidelink shared channel transmission.

In an additional aspect of the disclosure, a non-transitory computer-readable medium stores instructions that, when executed by a processor, cause the processor to perform operations. The operations include receiving, by a wireless communication device, a sidelink shared channel transmission via a first component carrier; obtaining, by the wireless communication device, a feedback resource indication; and transmitting, by the wireless communication device, a sidelink channel feedback transmission in a sidelink channel feedback transmission resource via a second component carrier different from the first component carrier, the sidelink channel feedback transmission resource determined based on the feedback resource indication, and the sidelink channel feedback transmission indicates feedback data for the sidelink shared channel transmission.

In another aspect of the disclosure, a method for wireless communication includes transmitting, by a wireless communication device, a sidelink shared channel transmission via a first component carrier. The method also includes obtaining, by the wireless communication device, a feedback resource indication. The method further includes receiving, by the wireless communication device, a sidelink channel feedback transmission in a sidelink channel feedback transmission resource via a second component carrier different from the first component carrier. The sidelink channel feedback transmission resource is determined based on the feedback resource indication, and the sidelink channel feedback transmission indicates feedback data for the sidelink shared channel transmission.

In an additional aspect of the disclosure, an apparatus includes at least one processor and a memory coupled to the at least one processor. The at least one processor is configured to transmit a sidelink shared channel transmission via a first component carrier; obtain a feedback resource indication; and receive a sidelink channel feedback transmission in a sidelink channel feedback transmission resource via a second component carrier different from the first component carrier, the sidelink channel feedback transmission resource determined based on the feedback resource indication, and the sidelink channel feedback transmission indicates feedback data for the sidelink shared channel transmission.

In another aspect of the disclosure, a method for wireless communication includes transmitting feedback resource indication information to a user equipment. The feedback resource indication information configured to indicate specific resources of a particular component carrier for feedback for sidelink carrier aggregation when receiving data on another particular component carrier. The method optionally includes transmitting a feedback resource indication to the user equipment. The feedback resource indication information is configured to indicate specific resources of a particular component carrier for feedback for a particular sidelink channel transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a diagram illustrating examples of indexes for determining HARQ resource indications according to one or more aspects.

FIG. 7 is a diagram illustrating examples of offset information for determining HARQ resource indications according to one or more aspects.

Like reference numbers and designations in the various drawings indicate like elements.

DETAILED DESCRIPTION

Figure 1:
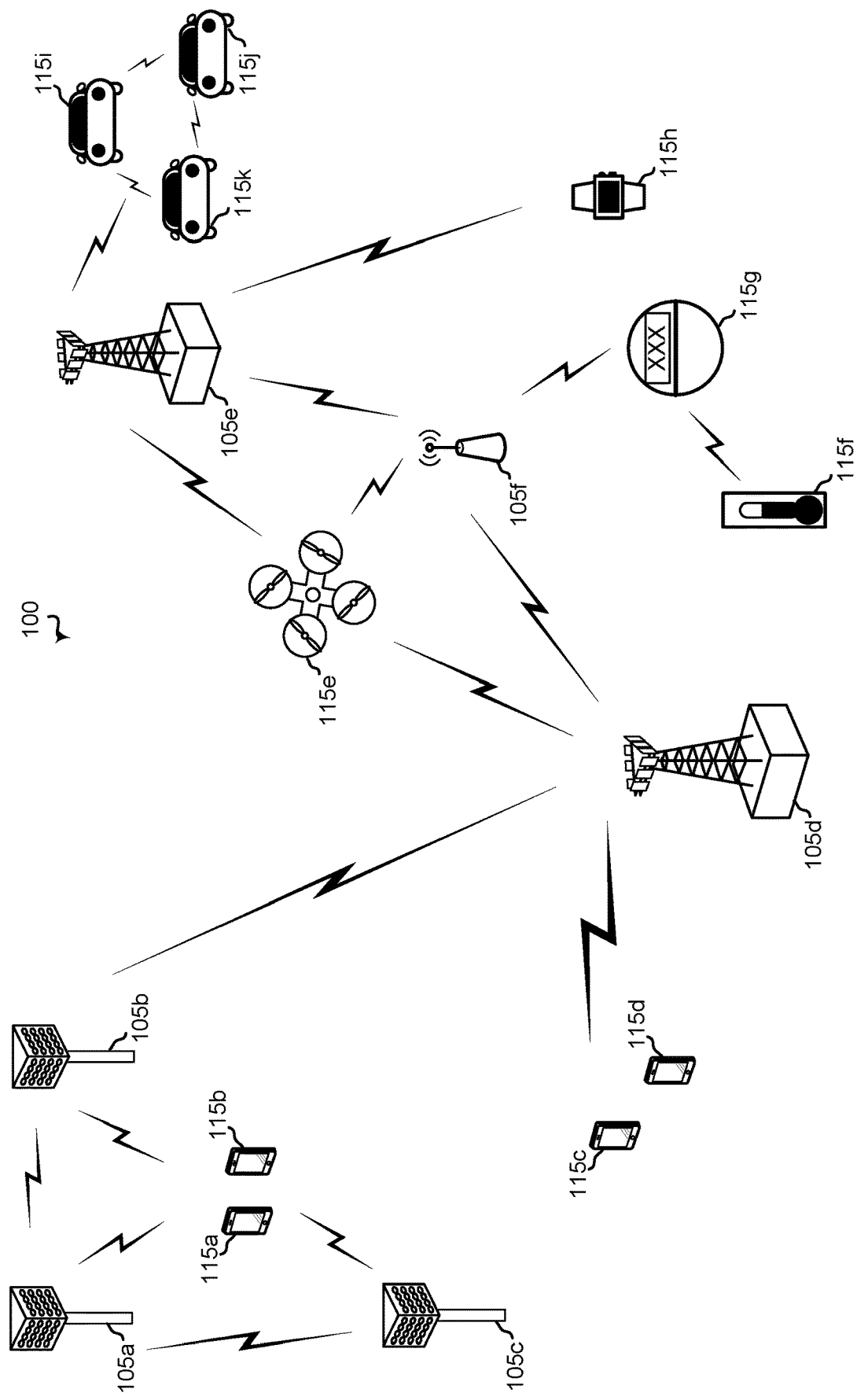
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~ 1 millisecond (ms)), and users with wide ranges of mobility or lack thereof, and (3) with enhanced mobile broadband including extreme high capacity (e.g., ~ 10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
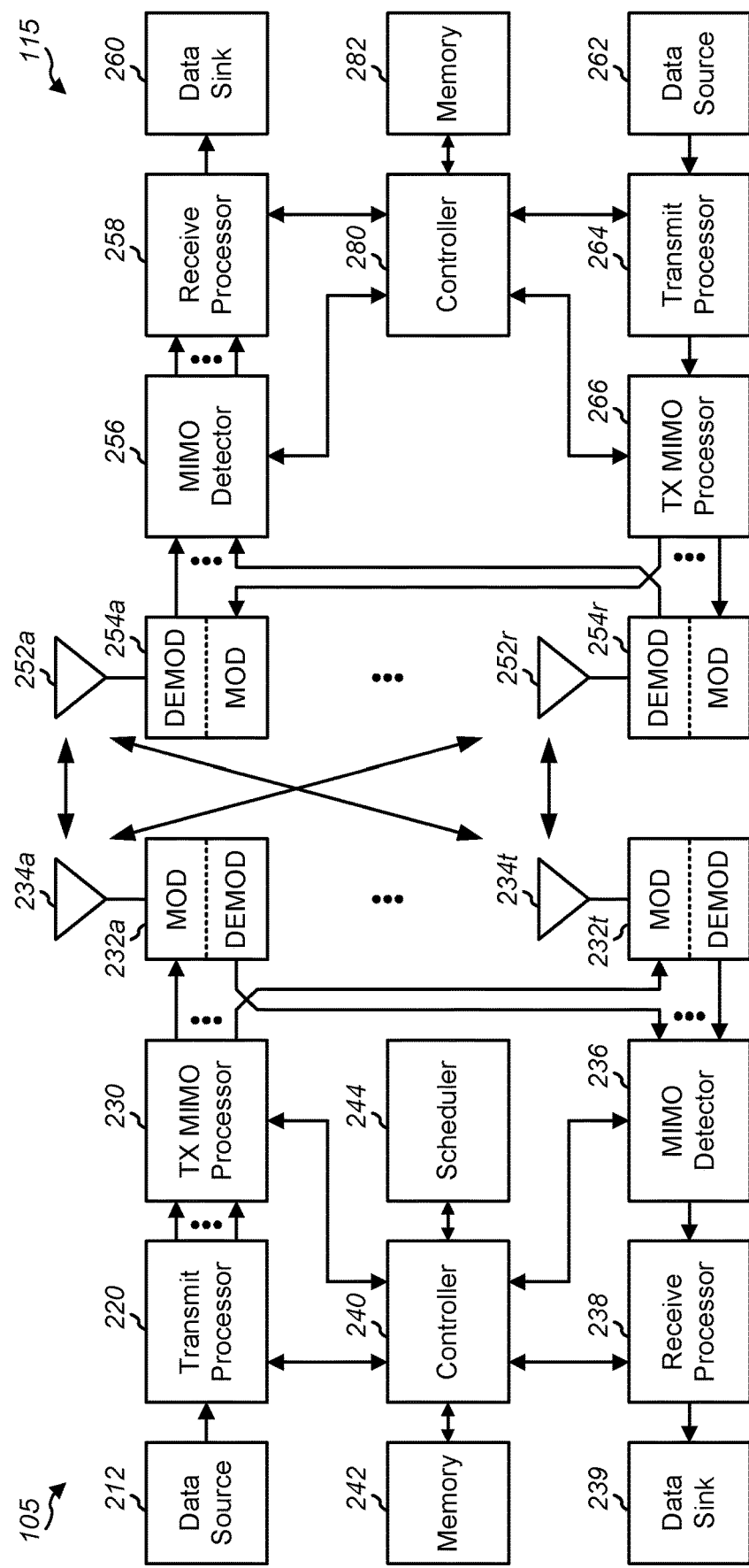
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

The aspects described herein are directed to enhancements for sidelink carrier aggregation operations. The enhancements may enable reduced collisions or may avoid collisions between UEs for sidelink feedback transmissions. The aspects described herein include feedback resource identification procedures to reduce or avoid collisions between UEs attempting to report feedback for sidelink transmissions.

Carrier aggregation enables a device to use multiple component carriers (CCs) to transmit and/or receive data simultaneously. The use of carrier aggregation enables higher bandwidth and throughput. The component carriers are often referred to as carriers. Different transmission types or directions can use carrier aggregation. For example, carrier aggregation can be used in uplink, downlink, and sidelink operations. Sidelink carrier aggregation operations were instituted in LTE for simultaneous transmission on different carriers.

Sidelink carrier aggregation in LTE was designed for supporting broadcast transmissions, such as broadcast system messages (BSMs). Sidelink carrier aggregation in LTE has no feedback operations for such broadcast messages.

It has been proposed to add carrier aggregation to 5G NR sidelink operations, as none are currently supported. NR sidelink operations may support feedback for unicast and groupcast sidelink transmissions. Two options are possible for supporting HARQ feedback for sidelink operations over multiple carriers.

The first option (Case 1) is where the HARQ feedback is managed per carrier independently. That is, a sidelink transmission (PSSCH transmission) on a first carrier (carrier X) and over a first resource pool (resource pool Y) triggers a feedback transmission (PSFCH transmission) in the same carrier and resource pool. To illustrate, a data transmission and its corresponding HARQ feedback transmission would be on the same carrier and resource pool.

The second option (Case 2) is where the HARQ feedback is managed across carriers. That is, a sidelink transmission (PSSCH transmission) on a first carrier (carrier X) and over a first resource pool (resource pool Y) triggers a feedback transmission (PSFCH transmission) on a different carrier and possibly different resource pool. To illustrate, a data transmission and its corresponding HARQ feedback transmission would be on different carriers. Such operations may be similar to that of a Pcell for Uu operations (i.e., a radio interface between a UTRAN (UMTS Terrestrial Radio Access Network) and a UE), that is a given resource pool/carrier is assigned for providing sidelink HARQ feedback for PSCCH/PSSCH transmissions on a set of carriers.

For the second option of managing the feedback across carriers, two alternatives for providing feedback are possible. In the first alternative (Case 2-1), each transmission (PSSCH) on a first carrier (carrier X) maps to a single PSFCH on a second carrier (carrier Y). That is, there is a one-to-one mapping between each transmission and feedback report.

In the second alternative (Case 2-2), the mapping is a many-to-one mapping where each feedback report is associated with a device/transmitter (e.g., a source ID) and/or a second device/receiver (e.g., destination ID). In many-to-one mapping implementations, the feedback report includes feedback information (e.g., HARQ information bits) associated with multiple transmissions (PSSCHs). The HARQ information bits associated with multiple PSSCHs from the same transmitter are mapped to a single PSFCH resource.

As compared to the one-to-one mapping, a many-to-one mapping may reduce additional power backoff. For example, the many-to-one mapping may reduce an amount of feedback reports sent (as each report can provided feedback for multiple transmissions), and the reduced reports may reduce the amount of simultaneous transmission and carrier aggregation operations, which incur additional power backoff. Reducing power backoff may reduce power consumption and interference (e.g., out-of-band interference).

However, the one-to-one mapping operations are simpler and might be the first step for enabling HARQ reporting for sidelink carrier aggregation or reducing collisions. Such mapping may be more beneficial for device with lower carrier aggregation capabilities and may reduce overhead in determining the timing of the operations.

The second option of managing the feedback across carriers in general (i.e., both Case 2-1 and Case 2-2) may be beneficial for UEs with asymmetric transmission and reception capabilities, that is a UE which has different capabilities for carrier aggregation with respect to transmission and reception. For example, in Uu UEs mostly have more downlink (DL) capabilities than uplink (UL) capabilities. In sidelink, it is likely that the UEs can receive data on a larger number of carriers as compared to the number of carriers that they support for transmission.

Figure 3B:
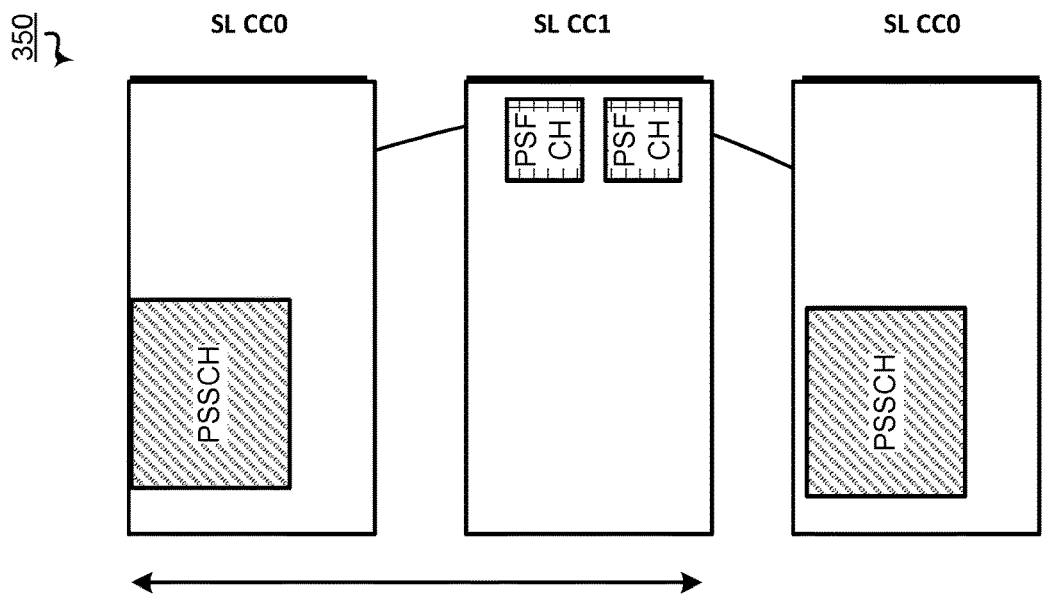
FIGS. 3A and 3B are diagrams illustrating examples of sidelink carrier aggregation feedback operations.
Figure 3A:
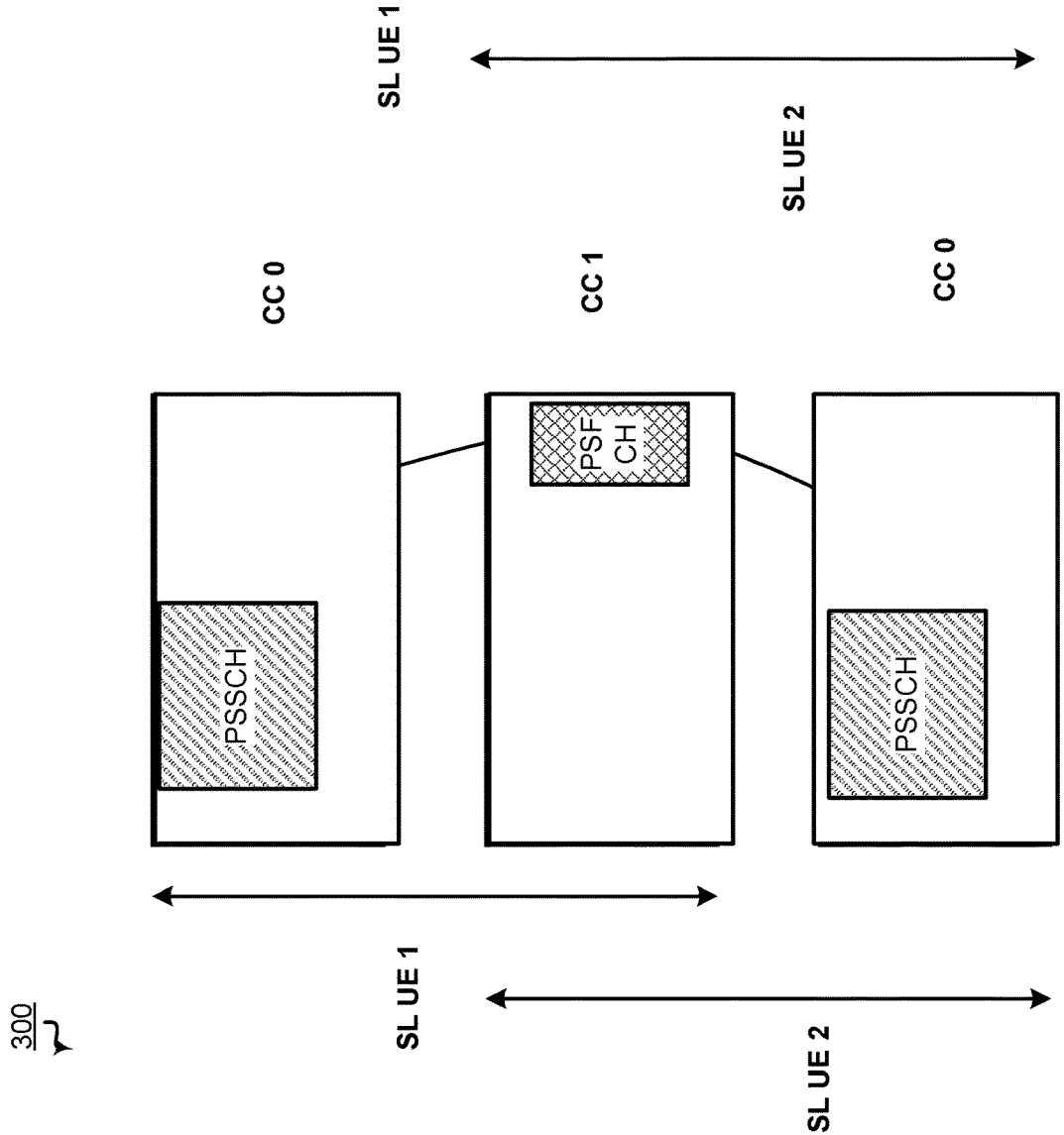

However, when using different carriers (such as in Case 2 operations) it is possible that different UEs aggregate a different set of carriers for sidelink operation and their HARQ reporting falls on the same carrier, such as described in FIG. 3A.

FIGS. 3A and 3B illustrate example diagrams depicting different sidelink carrier aggregation feedback operations. In FIG. 3A, a first diagram 300 illustrates an example of extending HARQ feedback operations for Release 16 to sidelink carrier aggregation feedback operations. Referring to the first diagram 300 of FIG. 3A, the first diagram 300 illustrates component carriers for two UEs, SL UE 1 and SL UE 2. Each UE has multiple component carriers. In the example first diagram 300, each UE has two component carriers, CC 0 and CC 1. As illustrated, each UE may have its own mapping of component carriers to bands/spectrum. That is, two UEs may have overlapping component carriers with the same or different component carrier index number. In the example shown in FIG. 3A, both UEs have a same active component carrier (middle component carrier) with a same index (CC 1). This may cause feedback collision on the shared carrier from transmissions on a corresponding carrier, which may be different.

For example, the first UE (SL UE 1) is aggregating the top two CCs which are indexed 0 and 1 from the first UE's point of view, and the second UE (SL UE 2) is aggregating the bottom two CCs which are indexed 0 and 1 from the second UE's point of view.

Both UEs (and optionally their peers) may select the same CC (e.g., middle CC) as the HARQ CC for carrying HARQ feedback. Hence, without additional considerations, their PSSCH transmissions on different carriers may have overlapping HARQ reports from their peers. One cause of such overlap and collisions is that because these UEs (e.g., groups of UEs) do not know about each other's transmissions (e.g., the transmissions ones on the top and bottom carriers), collisions of feedback for the transmissions may not be avoided or mitigated with current procedures.

The collisions can happen under both Mode 1 (gNB assisted) and Mode 2 (UE independent sidelink) if the Rel. 16 PSFCH mapping is simply extended to sidelink carrier aggregation operations. To illustrate, during operation both the UEs may receive a sidelink transmission on a corresponding first CC (CC 0) as illustrated in the first diagram 300. That is the first UE (SL UE 1) receives a first sidelink transmission on the top CC and the second UE (SL UE 2) receives a second sidelink transmission on the bottom CC. As the transmissions are in the same slot, and are on the starting same sub-channel and/or have a same number of sub-channels, the corresponding feedback transmissions for both UEs are mapped by Release 16 procedures to the same transmission resources in the middle CC and overlap. Thus, both UEs attempt to transmit a PSFCH at the same time and on the same resources (sub-channel/physical resource blocks (PRBs) in the middle CC and experience a collision. One or both of the devices may not transmit the feedback transmission, and the transmitting device or devices may attempt to retransmit the data which was already received by the UEs.

Referring to FIG. 3B, a second diagram 350 is shown which illustrates an example of enhancing sidelink carrier aggregation feedback operations based on the techniques describe herein to reduce or avoid such collisions. The second diagram 350 illustrates implementing HARQ resource determination to reduce or avoid collisions. As compared to the operations illustrated in the first diagram 300, the UEs may reduce collisions or avoid collisions in the operations illustrated in the second diagram 350 by enhanced HARQ resource mapping. That is, the UEs may utilize HARQ resource indication information to determine a HARQ resource indication which assigns the UE transmission resources for sidelink feedback with a reduced chance of collision.

In the operations of the second diagram 350, after receiving the sidelink transmissions (first and second PSSCHs), each UE may determine a HARQ indication for its received transmission based on the component carrier and the transmission resources of the received transmission. For example, the UEs may use an index or offset to determine which sub-channel or PRBs of the middle component carrier to use for the feedback transmission. This way, each UE may utilize unique resources to transmit their feedback and reduce or avoid collisions.

The aspects described herein provide enhancements for feedback mapping for sidelink carrier aggregation operations. The enhancements may enable reduced collisions or may avoid collisions between UEs for sidelink feedback transmissions. The aspects described herein include mapping procedures to indicate particular resources on a carrier to reduce or avoid collisions between UEs attempting to report feedback for sidelink transmissions.

The aspects herein are applicable to both modes of sidelink operations, that is Mode 1 (gNB assisted) and Mode 2 (UE independent sidelink). Additionally, the aspects herein are applicable to Case 2 feedback operations, that is where feedback reports are sent on a carrier which is different from a carrier of at least one of the transmissions of the feedback report.

In some implementations where a one-to-one mapping between PSSCH and PSFCH resources is maintained, each UE my receive a configuration (such as a configuration indication) indicating a subset of PSFCH resources available on a particular sidelink component carrier (e.g., carrier X which is chosen for carrying HARQ reports for a UE) when receiving PSSCH on a first sidelink component carrier (e.g., carrier Y). This configuration indication may be available at the sidelink transmitter UE for the purpose of receiving PSFCH and to the sidelink receiver UE for the purpose of transmitting PSFCH. For example, the configuration indication may be/at determined by the UEs or received from another device (e.g., a network device). This configuration indication may be referred to as a feedback resource indication (e.g., a HARQ resource indication).

In some such implementations where the UEs determine the feedback resource indication, the feedback resource indication may be obtained or derived from feedback resource information (e.g., HARQ resource indication information). In some other implementations, the feedback resource indication is received from another device, such as a network device (e.g., base station) or another UE (e.g., a master node).

In some such implementations, the feedback resource information or the feedback resource indication is a pairwise one. That is, each PSSCH carrier and/or resource may have a corresponding PSFCH carrier and/or resource. As illustrative examples, carrier 1 may map to carrier 2 (e.g., such as particular resources on carrier 2) and carrier 2 may map to carrier 3. As other illustrative examples, carriers 1 and 2 may map to carrier 3 (e.g., such as particular resources on carrier 3) and carriers 2 and 3 may map to carrier 4.

The term feedback resource indication information as used herein may be shortened to feedback indication information, and the term feedback resource indication as used herein may be shortened to feedback indication. The feedback indication information is configured to indicate feedback resources for sidelink feedback reporting for sidelink carrier aggregation operations. Similarly, the term HARQ resource indication information as used herein may be shortened to HARQ indication information, and the term HARQ resource indication as used herein may be shortened to HARQ indication. The HARQ indication information is configured to indicate HARQ resources for sidelink feedback reporting for sidelink carrier aggregation operations.

The feedback resource indication information may be stored in any suitable format which enables a device (e.g., a UE) to retrieve a component carrier for feedback reporting and particular resources on the component carrier (e.g., a group of PRBs or a starting PRB) based on one or more component carriers used to receive sidelink data transmissions and optionally information regarding the specific resources of the data transmission (e.g., such as starting sub-channel, number of sub-channels, etc.).

As an illustrative example, in some implementations the feedback resource indication information (e.g., HARQ indication information) could be in the form of an index (e.g., a table, look-up table, codebook, etc.). To illustrate, the PSFCH resources on a particular component carrier (CC X) are split into multiple groups; the indication points to the index of one of the PSFCH groups.

In some implementations, for each PSFCH/resource group, the number of PSFCH resources (e.g., RBs) may be equal to the number of sub-channels of carrier Y in one PSFCH period of carrier X or a multiple thereof. Additionally, or alternatively, within each group, the same PSSCH-to-PSFCH mapping as adopted in Rel. 16 may be used.

Alternatively, the feedback resource indication (e.g., HARQ resource indication information) could be in a form of an offset, where the offset points to a first RB in the PSFCH occasion on a particular component carrier (e.g., carrier X) which is available for reporting HARQ feedback of a PSSCH received on another component carrier (e.g., carrier Y).

Similarly, as with the index, when an offset is used the number of PSFCH resources/RBs is equal to the number of sub-channels of carrier Y in one PSFCH period of carrier X (or multiple thereof). Additionally, or alternatively, the same PSSCH-to-PSFCH mapping as adopted in Rel. 16 can be used can be used for the offset type feedback resource indication information.

The sidelink carrier aggregation feedback techniques described herein can be used with bandwidth part (BWP) and resource pools. As mentioned earlier, each BWP configured for sidelink may include one or more resource pools. When a sidelink BWP includes multiple resource pools, the sidelink carrier aggregation feedback techniques described herein may further provide a resource pool indication. For example, the feedback resource indication and/or feedback resource indication information may further indicate or include an index of a resource pool for the operations and feedback reporting. Such a resource pool indication may enable sidelink feedback information to be sent via a resource pool which differs from the resource pool of the sidelink transmission, when multiple resource pools are configured. Additionally, the resource pool indication may enable sidelink feedback information to be aggregated and sent via a designated or particular resource pool which differs from the resource pools of the sidelink transmissions, when multiple resource pools are configured.

As an example of resource pool indication, a first UE (UE 1) is operating with sidelink carrier aggregation for two component carriers (e.g., CC0 and CC1). The HARQ indication information and/or the HARQ indication may specify that for a PSSCH received on a second CC (CC1) and a first resource pool (e.g., a resource pool with index X) for the first UE, the corresponding PSFCH should be reported on a first CC (CC0) and in a second resource pool (e.g., a resource pool with index Y).

In any of the above implementations, a resource mapping, such as the mapping between the PSSCH and PSFCH, may be based on one or more parameters. As an illustrative, non-limiting example, the mapping between the PSSCH and the PSFCH is a function of UE IDs, resource pool index, and/or the HARQ resource indication as mentioned earlier.

As an alternative to providing the resource pool index and the HARQ resource indication to both transmitter UEs and receiver UEs, the resource pool indication information may be provided to the sidelink transmitter UE. The sidelink transmitter UE may then communicate them with the sidelink receiver UE; this communication may be communicated via SCI, MAC-CE or even during PC5 link setup over PC5 RRC for unicast communication.

The sidelink carrier aggregation feedback techniques described herein can be used for all modes of sidelink operation, such as Mode 1 and Mode 2. Under Mode 1 RA or, in general, when the network is in charge of setting up sidelink carrier aggregation for a group of UEs, the HARQ indication information could be sent by a network device (e.g., a gNB) to each sidelink UE. Alternatively, the HARQ indication information could be sent by the network device (e.g., the gNB) to some sidelink UEs, and one or more of the sidelink UEs which received the HARQ indication information may transmit (e.g., forward or relay) the HARQ indication information to other SL UEs.

Under Mode 2 RA or, in general, when the sidelink carrier aggregation operations are not setup or directly controlled by a network device (e.g., a gNB), the HARQ indication information could be pre-configured, such as pre-stored on the UE or acquired from a network device in the past. Alternatively, a master UE or host UE may generate and/or provide the HARQ indication information to other UEs. In such implementations, the HARQ indication information may correspond to the index or offset information described above which the UE may use to determine a specific HARQ indication and feedback resource. In such a case, for the set of possible aggregated carriers, the HARQ indication information could be provided by or to the UE. For example, if in total 3 CCs can be aggregated for a UE that is supporting sidelink carrier aggregation operations, the HARQ indication information could include an index or an offset with entries for different combination of the CCs and different possible settings of a HARQ reporting carrier.

The sidelink carrier aggregation feedback techniques described herein can be used for both unicast and groupcast communications. In some implementations, the feedback techniques may be cast type (e.g., unicast or groupcast) dependent. For example, the HARQ indication information may be unicast communications only or for groupcast communications only. As another example, the device may include multiple sets of HARQ indication information, such as first HARQ indication information for unicast and second HARQ indication information for group cast. Alternatively, in some other implementations, the feedback techniques may be cast type independent and the HARQ indication information may be used for both unicast and groupcast communications.

As an example scenario for cast type dependent HARQ feedback, is that UEs generally establish a PC5 link between each other for unicast communication. The PC5 link usually includes a capability exchange. However, for groupcast (at least for connection-less groupcast), this may not be the case. That is, a link (e.g., PC5 link) may not be established and a capability exchange may not occur. As a result, for groupcast the HARQ reporting carrier for a particular sidelink transmission might be different from the HARQ reporting carrier unicast. In other words, a UE may expect to receive a PSFCH or transmit a PSFCH associated with unicast and groupcast transmission on different resources for sidelink carrier aggregation feedback.

The sidelink carrier aggregation feedback techniques described herein can be used for many-to-one sidelink feedback reporting. For example, a UE with a many-to-one relation between PSSCH and PSFCH may report all HARQ bits associated with PSSCHs received from a specific UE (more accurately a given source ID) in one PSFCH transmission. The same HARQ indication information described above may be used to identify the transmission resource for the aggregated feedback in the single PSFCH transmission. However, instead of the HARQ indication information providing a UE with an HARQ resource indication for a PSSCH on carrier X with report on carrier Y, the HARQ resource indication is for a group of aggregated carriers. For example, if a UE is transmitting on CC0, CC1 and CC2 in a carrier aggregation manner, and the report is expected on CC0, the feedback report provides information about the HARQ resources for all PSSCHs on all 3 carriers instead of one indication for individual pairs of (CC0, CC0), (CC0, CC1) and (CC0, CC2).

Figure 4:
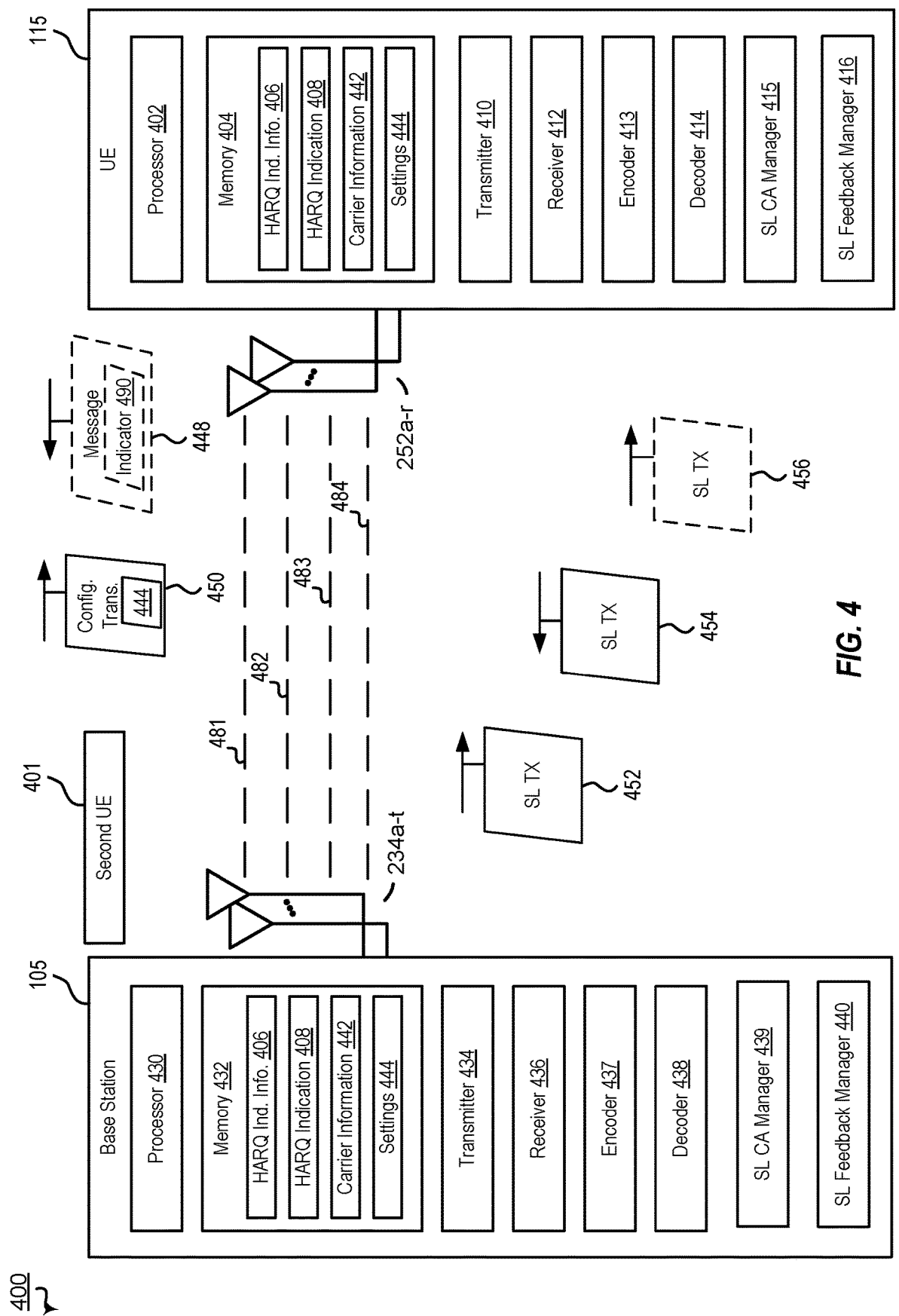
FIG. 4 is a block diagram illustrating an example wireless communication system that supports enhanced sidelink carrier aggregation feedback operations according to one or more aspects.

FIG. 4 illustrates an example of a wireless communications system 400 that supports enhanced sidelink carrier aggregation feedback operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, a UE 115, and a second UE 401. Use of enhanced sidelink carrier aggregation feedback operations may improve feedback reporting and reduce collision. Improved feedback reporting and reduced collision may reduce latency and increase throughput by decreasing failed transmissions. Thus, network and device performance can be increased.

UE 115, second UE 401, and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using Medium Access Control (MAC) Control Element (MAC CE) transmissions, Radio Resource Control (RRC) transmissions, sidelink control information (SCI) transmissions, another transmission, or a combination thereof.

UE 115, and optionally second UE 401, can include a variety of components (e.g., structural, hardware components) used for carrying out one or more functions described herein. For example, these components can includes processor 402, memory 404, transmitter 410, receiver 412, encoder, 413, decoder 414, SL CA manager 415, SL feedback manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store HARQ Indication Information data 406, HARQ Indication data 408, Carrier information data 442, settings data 444, or a combination thereof, as further described herein.

The HARQ Indication Information data 406 includes or corresponds to data associated with or corresponding to data for determining HARQ resource indications. The HARQ Indication Information data 406 may indicate or enable generation of a HARQ resource indication which identifies resources (e.g., sub-channels or PRBs) to be used for sidelink feedback reporting. The HARQ Indication Information data 406 may comprise an index, a table, a formula, an offset, etc. Examples of HARQ Indication Information data 406 are illustrated and described further with reference to FIGS. 6 and 7.

The HARQ Indication data 408 includes or corresponds to data associated or corresponding to an indication of resources (e.g., sub-channels or PRBs) to be used for sidelink feedback reporting. The HARQ Indication data 408 may indicate a particular starting sub-channel, a starting PRB, a PRB group, a PSFCH index, etc., to identify resources for sidelink feedback reporting. The HARQ Indication data 408 may optionally indicate a resource pool, a BWP, a cast type, a component carrier, or a combination thereof. The HARQ Indication data 408 may also be generated based on Release 16 mapping parameters and/or operations.

The carrier information data 442 includes or corresponds to data associated with component carriers for sidelink operations. The carrier information data 442 may include which component carriers are available for sidelink and may include a mapping or index values for such carriers. Additionally, or alternatively, the carrier information data 442 may include which component carrier or carriers were used to receive sidelink communications (e.g., PSSCHs) and which carriers are to be used for sidelink feedback reporting.

The settings data 444 includes or corresponds to data associated with sidelink carrier aggregation feedback operations. The settings data 444 may include settings and/or conditions data for determination, indication, or reporting, operations for sidelink carrier aggregation feedback. The settings data 444 may include PSSCH information data, resource pool data, BWP data, cast type data, PSSCH-to-PSFCH mapping data, etc. In some implementations, the UE 115 may store other data, such as transmission data, feedback data, feedback report data, and/or HARQ-ACK information data.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. SL CA manager 415 may be configured to determine and perform sidelink carrier aggregation operations. For example, SL CA manager 415 is configured to perform sidelink carrier aggregation determination, generation, and/or communication operations. As an illustrative example of determination operations, the SL CA manager 415 may determine which component carriers to use for carrier aggregation. To illustrate, the SL CA manager 415 may determine a number of carriers to use and which carriers to use based on device settings (e.g., standard or region settings), network indication, or based on device side calculation or look-up. As an illustrative example of generation operations, the SL CA manager 415 may generate the transmission to be carrier aggregated. As an illustrative example of communication operations, the SL CA manager 415 may transmit and/or receive multiple transmissions at the same time.

SL feedback manager 416 may be configured to determine and perform sidelink channel feedback operations. For example, SL feedback manager 416 is configured to determine what transmission resources to use for feedback reporting. To illustrate, SL feedback manager 416 may determine a HARQ resource indication based on HARQ resource indication information. As another illustration, the SL feedback manager 416 may receiving a HARQ resource indication form another device and determine the transmission resources independent of HARQ resource indication information. As another example, the SL feedback manager 416 is configured to generate and transmit the feedback information. To illustrate, the SL feedback manager 416 tracks the reception of sidelink transmissions, generates feedback information bits for the receptions, and generates a report including or indicating the information bits.

Base station 105 includes processor 430, memory 432, transmitter 434, receiver 436, encoder 437, decoder 438, SL CA manager 439, SL feedback manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store HARQ Indication Information data 406, HARQ Indication data 408, Carrier information data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. SL CA manager 439 may include similar functionality as described with reference to SL CA manager 415. SL feedback manager 440 may include similar functionality as described with reference to SL feedback manager 416.

During operation of wireless communications system 400, base station 105 or a UE (e.g., UE 115 or second UE 401) may determine that another UE (e.g., the other of UE 115 or second UE 401) has sidelink operation capability. For example, base station 105, UE 115, or second UE 401 may transmit a message 448 that includes a sidelink operation capability indicator 490. Indicator 490 may indicate enhanced sidelink operation capability operations or a particular type or mode of sidelink operations. In some implementations, a base station 105 sends control information to indicate to UE 115 that enhanced sidelink operations and/or a particular type of enhanced sidelink operations are to be used. For example, in some implementations, message 448 (or another message, such as configuration transmission 450) is transmitted by the base station 105. The configuration transmission 450 may include or indicate to use enhanced sidelink feedback operations or to adjust or implement a setting of a particular type of sidelink feedback operations. For example, the configuration transmission 450 may include settings data 444, as indicated in the example of FIG. 4, in addition to or in the alternative of the HARQ Indication Information data 406 and/or the HARQ Indication data 408.

During operation, devices of wireless communications system 400, perform enhanced sidelink feedback operations. For example, the wireless communication devices (e.g., two or more UEs) exchange transmissions when operating with network scheduling (e.g., gNB assistance). As another example, the devices (e.g., the two or more UEs) may be operating without network scheduling (e.g., the gNB assistance). In some implementations, as illustrated in FIG. 4, data transmission are exchanged via a sidelink channel in NR-U.

In the example of FIG. 4, the UE 115 receives a sidelink transmission 452 from the second UE 401. The sidelink transmission 452 may include or correspond to a PSCCH transmission or a PSSCH transmission.

The UE 115 may receive the sidelink transmission 452 and may generate feedback information for the sidelink transmission 452. For example, the UE 115 may generate one or more HARQ-ACK feedback bits indicating whether or not the UE 115 received at least the sidelink transmission 452. In some implementations, the UE 115 may generate a feedback report, such as a HARQ-ACK feedback report.

The UE 115 may receive the sidelink transmission 452 and may determine a transmission resource for reporting the feedback information for at least the sidelink transmission 452. The UE 115 (e.g., the SL feedback manager 416) may determine a feedback indication, such as a HARQ resource indication for the feedback of the sidelink transmission 452. For example, the UE 115 may determine the HARQ resource indication based on transmission resources of the sidelink transmission 452 and feedback indication information. To illustrate, the UE 115 may utilize a table, index, and/or offset information to map the sidelink transmission to its corresponding feedback resources. In some implementations, the UE 115 may determine the feedback resources, such as a group of PRBs of a particular component carrier based on a starting sub-channel of the sidelink transmission 452 and a component carrier of the sidelink transmission 452. Examples of information for determining the resources are described further with reference to FIGS. 6 and 7.

During the identified transmission resources, the UE 115 (e.g., the SL feedback manager 416) transmits the sidelink feedback information in a sidelink channel feedback transmission 454. The sidelink channel feedback transmission 454 may comprise a PSFCH transmission. The sidelink channel feedback transmission 454 may indicate feedback for only the sidelink transmission 452 in some implementations. In other implementations, the sidelink channel feedback transmission 454 indicates feedback for multiple transmissions, such as all transmission in a particular time period and/or from a particular source (e.g., source ID/transmitter UE).

The second UE 401 receives the sidelink channel feedback transmission 454 and determines if the sidelink transmission 452 was successfully received by the UE 115. As the UE 115 transmitted the sidelink channel feedback transmission 454 in resources which may be unique to or assigned to the device, the sidelink channel feedback transmission 454 may not collide or overlap with other sidelink feedback reporting transmission from other devices.

In some implementations, the second UE 401 determines if one or more additional sidelink channel transmissions were received or not. If a transmission, such as sidelink transmission 452, was not received, the second UE 401 may optionally retransmit the unreceived transmission as a second sidelink channel transmission 456.

Accordingly, the UE 115 and the second UE 401 may be able to more effective perform sidelink carrier aggregation feedback operations. Thus, FIG. 4 describes enhanced sidelink carrier aggregation feedback operations for wireless communication devices. Performing enhanced sidelink carrier aggregation feedback operations enables reduced collisions and thus, enhanced UE and network performance by increasing throughput and reducing errors and latency.

Figure 5:
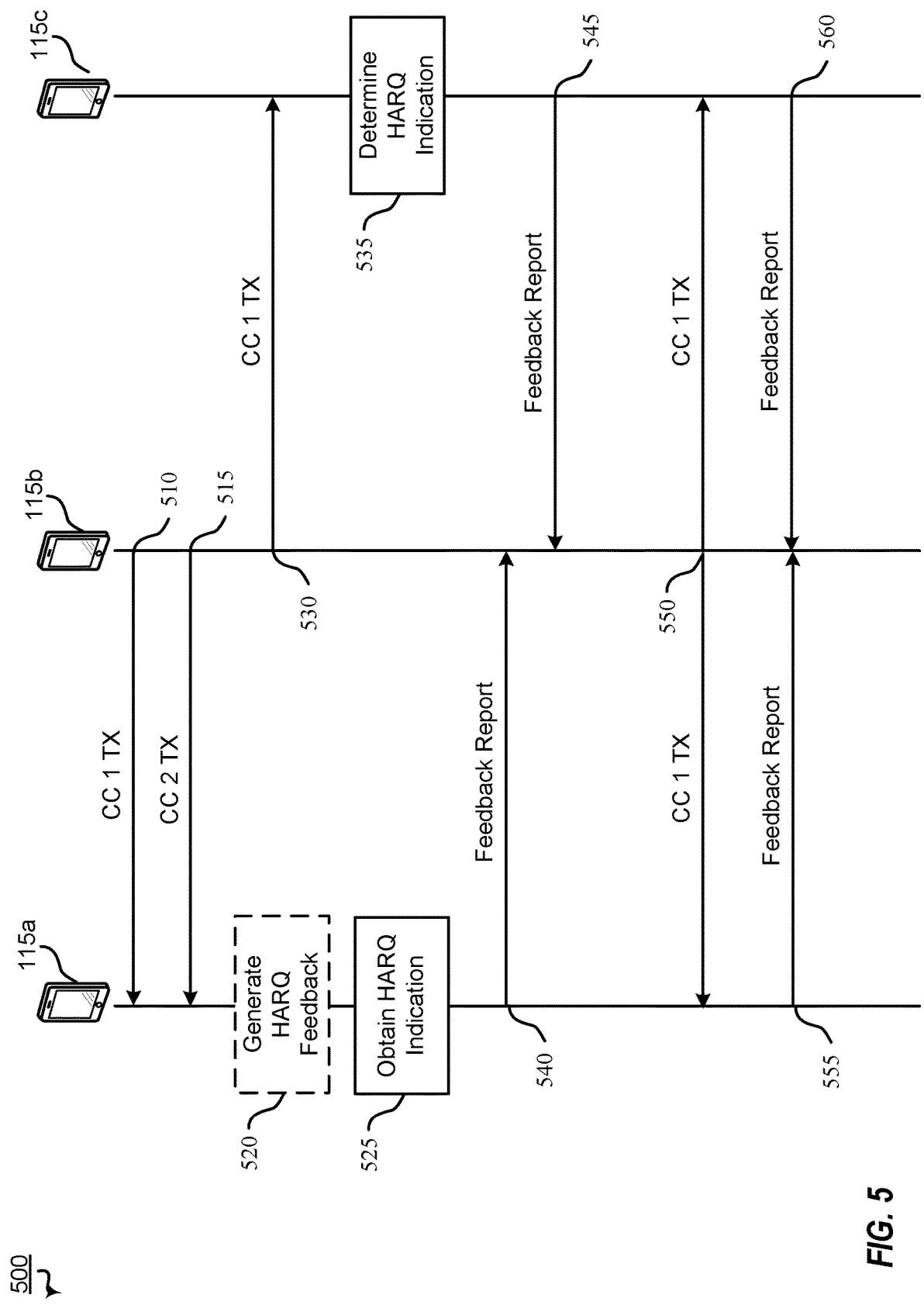
FIG. 5 is a ladder diagram illustrating an example wireless communication system that supports enhanced sidelink carrier aggregation feedback operations according to one or more aspects.

FIG. 5 illustrates an examples of a ladder diagram for sidelink carrier aggregation feedback operations according to some aspects. Referring to FIG. 5, FIG. 5 is a ladder diagram 500 of sidelink carrier aggregation feedback operations. In the example of FIG. 5, the ladder diagram illustrates multiple UEs, such as a first UE 115a, a second UE 115b, and a third UE 115c. The diagram 500 is simplified for illustration and explanation. In practice, many UEs may be connected to each other and optionally to a network entity.

At 510, the second UE 115b transmits a sidelink data transmission on a first component carrier (CC1) of the second UE 115b to the first UE 115a. For example, the second UE 115b transmits a first PSSCH transmission to the first UE 115a.

At 515, the second UE 115b transmits a second sidelink data transmission on a second component carrier (CC2) of the second UE 115b to the first UE 115a. For example, the second UE 115b transmits a second PSSCH transmission to the first UE 115a.

At 520, the first UE 115a optionally generates feedback information, such as HARQ feedback information in the example of FIG. 5. For example, the first UE 115a generates one or more HARQ ACK information bits, such as for the first and/or second sidelink data transmissions. Additionally, the first UE 115a may generate a HARQ ACK feedback report indicating feedback for the first and second sidelink data transmissions.

At 525, the first UE 115a obtains a HARQ indication. For example, the first UE 115a determines a HARQ resource indication based on HARQ resource indication information and information regarding the first and second sidelink data transmissions. To illustrate, the first UE 115a may utilize the component carriers of the first and second sidelink data transmissions along with resource information of the first and second sidelink data transmissions to determine the HARQ resource indication based on the HARQ resource indication information. The HARQ resource indication specifies which resources, and optionally which component carrier, to use to transmit the feedback information. As another example, the first UE 115a receives the HARQ indication from another device, such as the second UE 115b, the third UE 115c, or a network device (not shown) such as base station 105. The first UE 115a may optionally use HARQ resource indication information stored at the device and the received HARQ indication to identify the transmission resources.

At 530, the second UE 115b transmits a third sidelink data transmission on a first component carrier (CC1) of the second UE 115b to the third UE 115c. For example, the second UE 115b transmits a third PSSCH transmission to the third UE 115c.

At 535, the third UE 115c determines a HARQ indication. For example, the third UE 115c determines a HARQ resource indication based on HARQ resource indication information and information regarding the third sidelink data transmission. To illustrate, the third UE 115c may utilize the component carrier of the third sidelink data transmission along with resource information of the third sidelink data transmission to determine the HARQ resource indication based on the HARQ resource indication information. The HARQ resource indication specifies which resources, and optionally which component carrier, to use to transmit the feedback information.

At 540, the first UE 115a transmits a feedback report to the second UE 115b. For example, the first UE 115a transmits a PSFCH transmission including a HARQ feedback report to the second UE 115b using the transmission resource(s) identified by the HARQ indication. The HARQ feedback report indicates feedback information for both the first and second PSSCH transmission in a same PSFCH transmission.

At 545, the third UE 115c transmits a second feedback report to the second UE 115b. For example, the third UE 115c transmits a second PSFCH transmission including a second HARQ feedback report to the second UE 115b using the transmission resource(s) identified by the second HARQ indication. The second HARQ feedback report indicates feedback information for a single PSSCH transmission, that is the third PSSCH transmission, in a single transmission.

At 550, the second UE 115b transmits a groupcast transmission on a first component carrier (CC1) of the second UE 115b to both the first UE 115a and the third UE 115c. For example, the second UE 115b transmits a fourth PSSCH transmission by groupcast to the first UE 115a and the third UE 115c.

At 555, the first UE 115a transmits a third feedback report to the second UE 115b. For example, the first UE 115a transmits a third PSFCH transmission including a third HARQ feedback report to the second UE 115b using the transmission resource(s) identified by a third HARQ indication. The third HARQ feedback report indicates feedback information for the fourth PSSCH transmission.

At 560, the third UE 115c transmits a fourth feedback report to the second UE 115b. For example, the third UE 115c transmits a fourth PSFCH transmission including a fourth HARQ feedback report to the second UE 115b using the transmission resource(s) identified by a fourth HARQ indication. The fourth HARQ feedback report indicates feedback information for the fourth PSSCH transmission.

Thus, in the example in FIG. 5, the UEs perform enhanced sidelink carrier aggregation feedback operations and reduce collisions. The reduction in collisions reduces latency and increases feedback reporting performance, which ultimately increases throughput and overall network performance.

FIGS. 6 and 7 are examples of HARQ indication information for determining HARQ feedback transmission resources, or as referred to herein HARQ resource indications. In FIG. 6, three example HARQ indexes are illustrated. The indexes in FIG. 6 are simplified for illustration and explanation. In other implementations, the indexes may include additional parameters. For example, in addition to or in the alternative of the starting sub-channel of PSSCH (sl-PSFCH-CandidateResourceType is configured as startSubCH) or the number of sub-channels in a PSSCH (sl-PSFCH-CandidateResourceType is configured as allocSubCH), one or more other metrics or parameters may be used, such as a slot of the PSSCH, a source ID, a destination ID, a resource pool ID, a BWP ID, etc. The indexes may include or correspond to tables, such as a look-up table, or a codebook. Additionally, or alternatively, the indexes may include fewer or different parameters than those illustrated. For example, an index may only include index values and resources (e.g., staring sub-channel or PRB group). The example indexes are for illustration only, and are not limiting.

A first index 600 illustrates index values which are associated with carrier aggregation component carrier (PSSCH carrier), a feedback component carrier (PSFCH carrier), and a PRB group. The first index 600 may be used to determine the feedback component carrier and the PRB group based on the index value and/or the carrier aggregation component carrier. For example, the UE 115 may determine the feedback component carrier and the PRB group based on the carrier aggregation component carrier.

A second index 610 illustrates index values which are associated with carrier aggregation component carrier (PSSCH carrier), a feedback component carrier (PSFCH carrier), and a starting PRB. The second index 610 may be used to determine the feedback component carrier and the starting PRB based on the index value and/or the carrier aggregation component carrier. For example, the UE 115 may determine the feedback component carrier and the starting PRB based on the carrier aggregation component carrier.

A third index 620 illustrates index values which are associated with carrier aggregation component carriers (PSSCH carriers), a feedback component carrier (PSFCH carrier), and a starting PRB. The third index 620 may be used to determine the feedback component carrier and the resource pool based on the index value and/or the carrier aggregation component carriers. For example, the UE 115 may determine the feedback component carrier (or carriers) and the resource pool based on the carrier aggregation component carriers.

In other implementations, one or more pieces of information of the indexes may be removed or added. For example, the third index 620 may further include PRB group information as in the first index 600 or starting PRB information as in the second index 610. As another example, the first index 600 or second index 610 may use and provide an indication for multiple carrier aggregation component carriers as in the third index 620. Additionally, when using multiple carriers, more than two carriers can be used.

In FIG. 7, two example HARQ offsets are illustrated. The offsets in FIG. 7 are simplified for illustration and explanation. In other implementations, the offsets may include additional parameters. For example, in addition to or in the alternative of the starting sub-channel of PSSCH or the number of sub-channels in a PSSCH, one or more other metrics or parameters may be used, such as a slot of the PSSCH, a source ID, a destination ID, a resource pool ID, a BWP ID, etc. Additionally, or alternatively, the offsets may include fewer or different parameters than those illustrated. The example offsets are for illustration only, and are not limiting.

A first offset 700 illustrates index values which are associated with carrier aggregation component carrier (PSSCH carrier), a feedback component carrier (PSFCH carrier), and offset. The first offset 700 may be used to determine the feedback component carrier and the offset based on the carrier aggregation component carrier. For example, the UE 115 may determine the feedback component carrier and the PRB group based on the carrier aggregation component carrier.

A second offset 710 illustrates information for carrier aggregation component carriers (PSSCH carriers), a feedback component carrier (PSFCH carrier), and offset. The second offset 710 may be used to determine the feedback component carrier and the offset based on the carrier aggregation component carriers. For example, the UE 115 may determine the feedback component carrier and the starting PRB based on the carrier aggregation component carrier.

In the alternative to indexes or offsets, a formula or equation may be used to generate one or more parameters, such as the starting PRB or the PRB group. In some such implementations, an index (and resulting index value) may still be used to indicate multiple parameters with a single value.

Figures 8, 9:
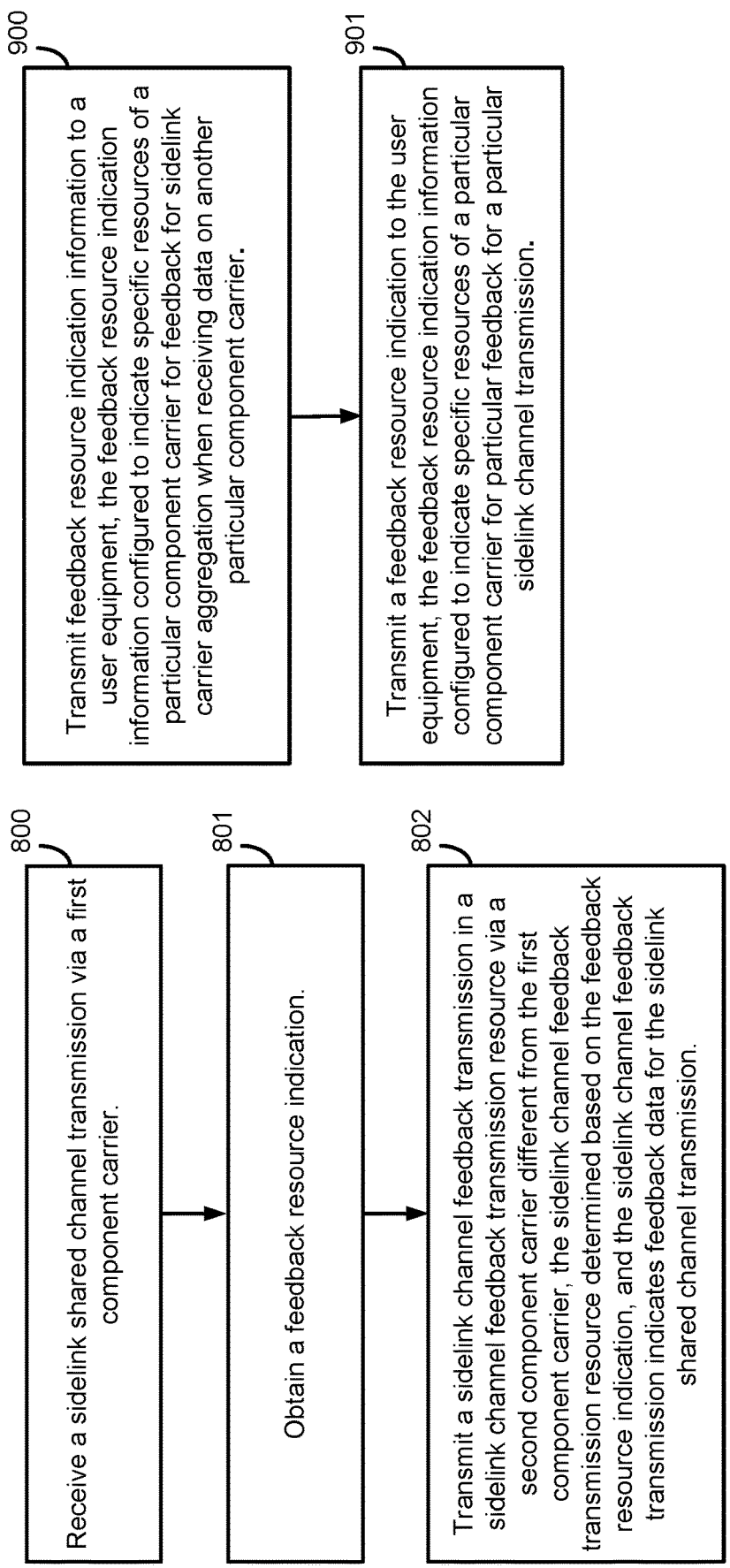
FIG. 8 is a flow diagram illustrating an example process that supports enhanced sidelink carrier aggregation feedback operations according to one or more aspects.
FIG. 9 is a block diagram of an example UE that supports enhanced sidelink carrier aggregation feedback operations according to one or more aspects.
Figure 10:
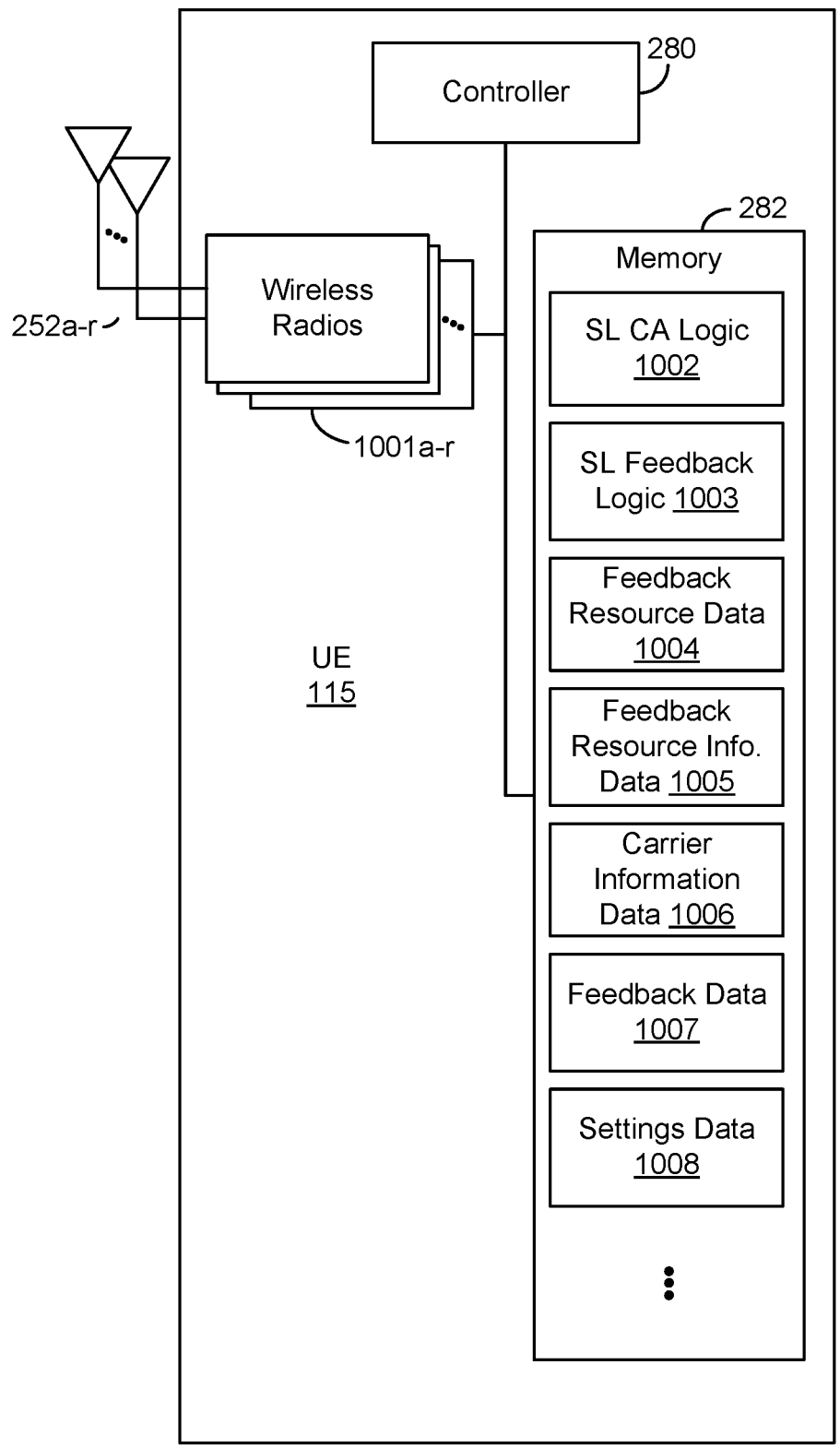
FIG. 10 is a flow diagram illustrating an example process that supports enhanced sidelink carrier aggregation feedback operations according to one or more aspects.

FIG. 8 is a flow diagram illustrating example blocks executed by a wireless communication device (e.g., a UE or base station) configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores SL CA logic 1002, SL feedback logic 1003, feedback resource indication data 1004, feedback resource indication information data 1005, carrier data 1006, feedback data 1007, and settings data 1008. The data (1002-1008) stored in the memory 282 may include or correspond to the data (406, 408, 442, 444) stored in the memory 404.

At block 800, a wireless communication device, such as a UE, receives a sidelink shared channel transmission via a first component carrier. For example, the UE 115 receives the sidelink transmission 452 on a first component carrier from the second UE 401, and optionally other transmissions on other component carriers using sidelink carrier aggregation, as described with reference to FIGS. 4 and 5. To illustrate, a receiver (e.g., receive processor 258 or receiver 412) of the UE 115 receives the PSSCH transmission on a first component carrier via wireless radios 1001a-r and antennas 252a-r and receives one or more second PSSCH transmission on second component carriers via wireless radios 1001a-r and antennas 252a-r.

At block 801, the UE 115 obtains a feedback resource indication. For example, the UE 115 determines resources for reporting feedback for the sidelink shared channel transmission from information previously received and/or stored in memory, or alternatively the UE receives an indication for the resources, as described with reference to FIGS. 4 and 5. The feedback resource indication may include or correspond to a HARQ resource indication. As an example illustration, the SL feedback manager 416 receives an indication which identifies an index value of an index which corresponds to particular PSFCH resources. The indication may be received from a network entity, such as the base station 105 directly or indirectly (e.g., through another UE, like the second UE 401). Alternatively, the indication may be generated by and received from another UE, such as the second UE 401. In some implementations, the indication is in a PSCCH transmission, an RRC transmission, or a SCI transmission. To illustrate, the indication may be received in message 448 or configuration transmission 450. As another illustration, the SL feedback manager 416 determines a set of PSFCH resources based on HARQ resource identification information and parameters of the sidelink shared channel transmission. Similarly, the HARQ resource identification information may be received from a second device, such as a network entity or another UE (e.g., the second UE 401) prior to receiving the sidelink channel transmission, and the UE 115 determines the indication based on the HARQ resource identification information.

At block 802, the UE 115 transmits a sidelink channel feedback transmission in a sidelink channel feedback transmission resource via a second component carrier different from the first component carrier. The sidelink channel feedback transmission resource is determined based on the feedback resource indication, and the sidelink channel feedback transmission indicates feedback data for the sidelink shared channel transmission. For example, the UE 115 transmits feedback information on a second component carrier, as described with reference to FIGS. 4 and 5. To illustrate, a transmitter (e.g., transmit processor 264/TX MIMO processor 266 or transmitter 410) of the UE 115 transmits a feedback report in the sidelink channel feedback transmission 454 indicating feedback information for at least the sidelink shared channel transmission, via wireless radios 1001a-r and antennas 252a-r.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, obtaining the feedback resource indication includes: receiving a hybrid automatic repeat request (HARQ) resource indication from another device; or determining a HARQ resource indication from HARQ resource indication information stored at the wireless communication device.

In a second aspect, alone or in combination with the first aspect, the wireless communication device further determines the sidelink channel feedback transmission resource based on the HARQ resource indication, wherein the sidelink channel feedback transmission resource includes HARQ acknowledgement (HARQ-ACK) feedback information.

In a third aspect, alone or in combination with one or more of the above aspects, the HARQ resource indication identifies a set of feedback resources in a slot of the second component carrier.

In a fourth aspect, alone or in combination with one or more of the above aspects, the wireless communication device further generates feedback data based on the sidelink shared channel transmission, wherein the sidelink channel feedback transmission indicates the feedback data.

In a fifth aspect, alone or in combination with one or more of the above aspects, the feedback resource indication comprises a hybrid automatic repeat request (HARQ) resource indication, and the wireless communication device further: obtains HARQ resource indication information from a network device, a user equipment, or from memory; and determines the HARQ resource indication based on the HARQ resource indication information and based on the sidelink shared channel transmission.

In a sixth aspect, alone or in combination with one or more of the above aspects, the HARQ resource indication information comprises an index, wherein the index identifies physical sidelink feedback channel (PSFCH) resources on a PSFCH component carrier that are available for reporting HARQ feedback for physical sidelink shared channel (PSSCH) transmissions on another component carrier.

In a seventh aspect, alone or in combination with one or more of the above aspects, the PSFCH resources on the PSFCH component carrier that are available for reporting the HARQ feedback are split into multiple groups, and wherein the HARQ resource indication points to an index number of one group of the multiple groups.

In an eighth aspect, alone or in combination with one or more of the above aspects, a number of PSFCH resources of each group of the multiple groups is equal to a number of sub-channels of the first component carrier in one PSFCH period of the second component carrier or to a multiple thereof.

In a ninth aspect, alone or in combination with one or more of the above aspects, the groups of the multiple groups comprise groups of resource block (RBs), and wherein the HARQ resource indication points to an index number of one group of RBs of the multiple groups of RBs.

In a tenth aspect, alone or in combination with one or more of the above aspects, the feedback resource indication comprises a hybrid automatic repeat request (HARQ) resource indication, and the wireless communication device further: obtains HARQ resource indication information from a network device, a user equipment, or from memory; and determines, the HARQ resource indication based on the HARQ resource indication information and based on the sidelink shared channel transmission.

In an eleventh aspect, alone or in combination with one or more of the above aspects, the HARQ resource indication information comprises an offset (e.g., a resource offset).

In an twelfth aspect, alone or in combination with one or more of the above aspects, the offset indicates a first resource in a physical sidelink feedback channel (PSFCH) occasion on the second component carrier which is available for reporting HARQ feedback of a physical sidelink shared channel (PSSCH) transmission received on the first component carrier.

In a thirteenth aspect, alone or in combination with one or more of the above aspects, the HARQ resource indication further includes offset information which indicates a first resource block (RB) in a physical sidelink feedback channel (PSFCH) occasion on a particular component carrier which is available for reporting HARQ of a physical sidelink shared channel (PSSCH) transmission received on each component carrier, bandwidth part (BWP), or resource pool of the apparatus.

In a fourteenth aspect, alone or in combination with one or more of the above aspects, the HARQ resource indication further includes resource information for reporting HARQ of a physical sidelink shared channel (PSSCH) transmission received on each component carrier configured for the apparatus, and where each component carrier is associated with a second component carrier for HARQ feedback.

In a fifteenth aspect, alone or in combination with one or more of the above aspects, the HARQ resource indication information indicates different resources for different cast types, and the wireless communication device further: determines a cast type of the sidelink shared channel transmission; and determines the HARQ resource indication based on the cast type of the sidelink shared channel transmission.

In a sixteenth aspect, alone or in combination with one or more of the above aspects, the wireless communication device is configured with multiple resource pools, and wherein the HARQ resource indication information further indicates a particular resource pool of the multiple resource pools.

In a seventeenth aspect, alone or in combination with one or more of the above aspects, the HARQ resource indication information is configured to indicate HARQ resources for a plurality of resource pools of the multiple resource pools.

In an eighteenth aspect, alone or in combination with one or more of the above aspects, the apparatus is configured with multiple bandwidth parts (BWPs), and wherein the HARQ resource indication information further indicates a particular BWP of the multiple BWPs.

In a nineteenth aspect, alone or in combination with one or more of the above aspects, the wireless communication device further receives hybrid automatic repeat request (HARQ) resource indication information from a network device; and transmits the HARQ resource indication information to a user equipment (UE), HARQ resource indication information.

In a twentieth aspect, alone or in combination with one or more of the above aspects, the sidelink shared channel transmission is a unicast transmission or a groupcast transmission.

In a twenty-first aspect, alone or in combination with one or more of the above aspects, the feedback resource indication information indicates resource information for multiple cast types.

In a twenty-second aspect, alone or in combination with one or more of the above aspects, the sidelink channel feedback transmission comprises a physical sidelink feedback channel (PSFCH) transmission and includes HARQ bits associated with multiple physical sidelink shared channel (PSSCH) transmissions received from a particular UE.

In a twenty-third aspect, alone or in combination with one or more of the above aspects, the feedback resource indication comprises a hybrid automatic repeat request (HARQ) resource indication, and the wireless communication device further: determines the HARQ resource indication based on a HARQ resource indication information, and the HARQ resource indication information indicates resource information for a group of aggregated component carriers.

In a twenty-fourth aspect, alone or in combination with one or more of the above aspects, the HARQ resource indication information indicates resource information for individual pairs of aggregated component carriers, and wherein the HARQ resource indication information indicates first resource information for a first pair of aggregated component carriers, second resource information for a second pair of aggregated component carriers, and third resource information for a third pair of aggregated component carriers.

In a twenty-fifth aspect, alone or in combination with one or more of the above aspects, the sidelink channel feedback transmission includes HARQ feedback information, and wherein HARQ feedback for sidelink transmissions is managed across carriers, and wherein each physical sidelink shared channel (PSSCH) transmission on a particular component carrier maps to a single physical sidelink feedback channel (PSFCH) resource on another component carrier.

In a twenty-sixth aspect, alone or in combination with one or more of the above aspects, the sidelink channel feedback transmission includes HARQ feedback information, wherein HARQ feedback for sidelink transmissions is managed across carriers, and wherein HARQ information bits associated with multiple physical sidelink shared channel (PSSCH) transmissions from a same transmitter for a first component carrier, bandwidth part (BWP), or resource pool are mapped to a single physical sidelink feedback channel (PSFCH) resource on a second component carrier, BWP, or resource pool.

In a twenty-seventh aspect, alone or in combination with one or more of the above aspects, the feedback resource indication is received from another device on the first component carrier.

In a twenty-eighth aspect, alone or in combination with one or more of the above aspects, the feedback resource indication is received from another device on the second component carrier.

In a twenty-ninth aspect, alone or in combination with one or more of the above aspects, the feedback resource indication is received from another device on a third component carrier.

In another aspect, a second wireless communication device, such as a second UE which is similar to UE 115, may communicate with the wireless communication device. For example, the second wireless communication device transmits a sidelink shared channel transmission via a first component carrier. For example, a second UE transmits a sidelink transmission 452 on a first component carrier and optionally other transmissions on other component carriers using sidelink carrier aggregation, as described with reference to FIGS. 4 and 5. To illustrate, a transmitter (e.g., transmit processor 264/TX MIMO processor 266 or transmitter 410) of the second UE transmits the PSSCH transmission on a first component carrier via wireless radios 1001*a-r* and antennas 252*a-r* and transmits one or more second PSSCH transmission on second component carriers via wireless radios 1001*a-r* and antennas 252*a-r*.

The second UE obtains a feedback resource indication. For example, the second UE determines resources for receiving feedback for the sidelink shared channel transmission from information previously received and/or stored in memory, or alternatively the second UE receives an indication for the resources, as described with reference to FIGS. 4 and 5. To illustrate, the SL feedback manager 416 receives an indication which identifies an index value of an index which corresponds to particular PSFCH resources.

As another illustration, the SL feedback manager 416 determines a set of PSFCH resources based on HARQ resource identification information and parameters of the sidelink shared channel transmission. The feedback resource indication may include or correspond to a HARQ resource indication.

The second UE receives a sidelink channel feedback transmission in a sidelink channel feedback transmission resource via a second component carrier different from the first component carrier. The sidelink channel feedback transmission resource is determined based on the feedback resource indication, and the sidelink channel feedback transmission indicates feedback data for the sidelink shared channel transmission. For example, the second UE transmits feedback information, as described with reference to FIGS. 4 and 5.

To illustrate, a receiver (e.g., receive processor 258 or receiver 412) of the second UE receives a feedback report in the sidelink channel feedback transmission 454 indicating feedback information for at least the sidelink shared channel transmission, via wireless radios 1001*a-r* and antennas 252*a-r*.

Accordingly, wireless communication devices may perform enhanced feedback reporting for sidelink carrier aggregation operations. By performing enhanced feedback reporting for sidelink carrier aggregation operations throughput may be increased and latency and errors may be reduced by reducing or avoiding collisions in feedback reporting transmission.

Figure 11:
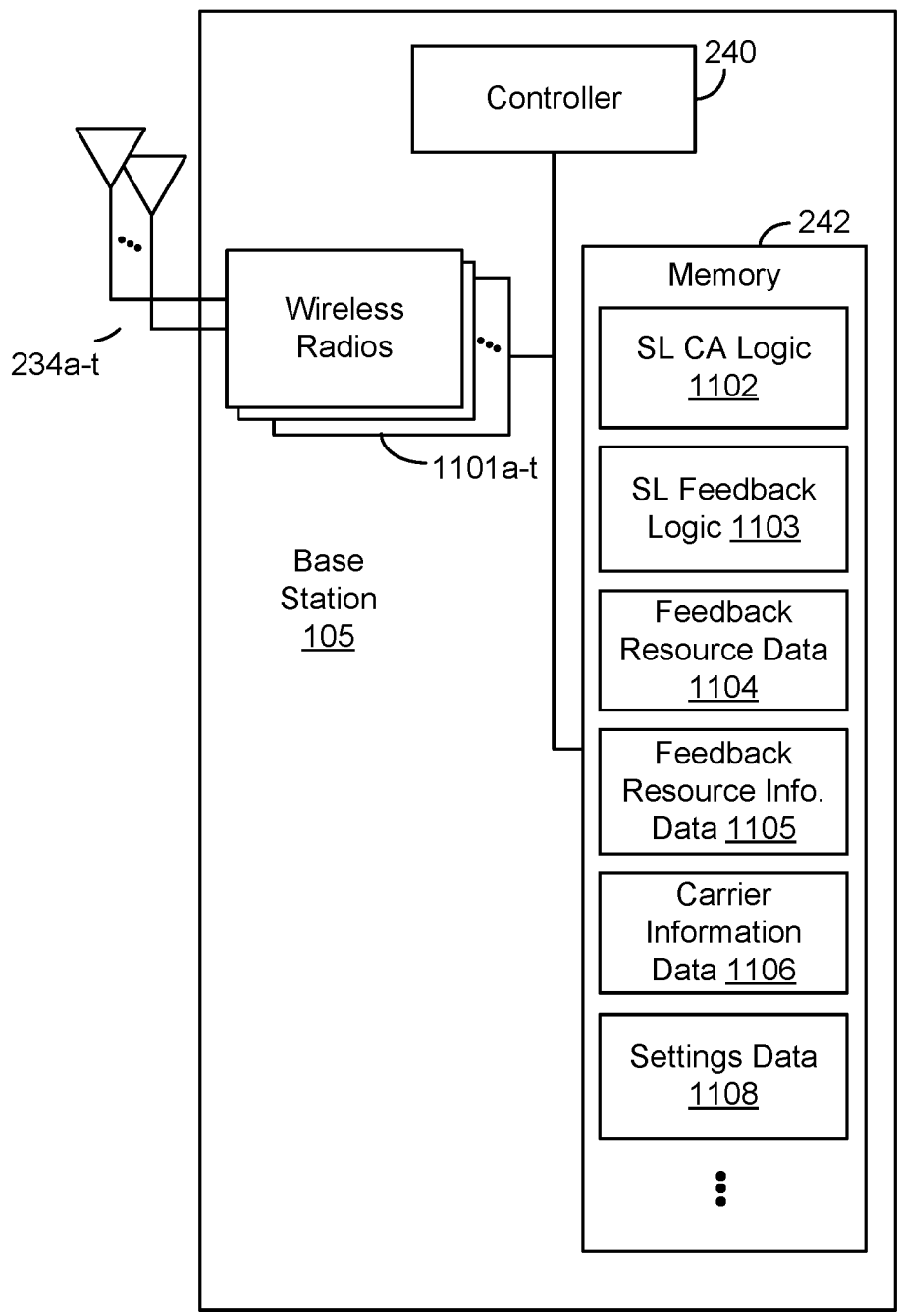
FIG. 11 is a block diagram of an example base station that supports enhanced sidelink carrier aggregation feedback operations according to one or more aspects.

FIG. 9 is a flow diagram illustrating example blocks executed wireless communication device (e.g., a UE or base station) configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1101*a-t* and antennas 234*a-t*. Wireless radios 1101*a-t* includes various components and hardware, as illustrated in FIG. 2 for base station 105, including modulator/demodulators 232*a-r*, MIMO detector 236, receive processor 238, transmit processor 220, and TX MIMO processor 230. As illustrated in the example of FIG.

11, memory 282 stores SL CA logic 1102, SL feedback logic 1103, feedback resource indication data 1104, feedback resource indication information data 1105, carrier data 1106, and settings data 1108.

At block 900, a wireless communication device, such as a base station 105, transmits feedback resource indication information to a user equipment. The feedback resource indication information configured to indicate specific resources of a particular component carrier for feedback for sidelink carrier aggregation when receiving data on another particular component carrier. For example, the base station 105 transmits a message (e.g., message 448 or 450) indicating to perform enhanced sidelink carrier aggregation feedback reporting, as described with reference to FIGS. 4 and 5. To illustrate, a transmitter (e.g., transmit processor 220/TX MIMO processor 230 or transmitter 434) of the base station 105 transmits a configuration message indicating settings data or feedback resource indication information via wireless radios 1101a-t and antennas 234a-t. The feedback resource information may include HARQ resource indication information. Examples of HARQ resource indication information are illustrated and described with reference to FIGS. 6 and 7.

At block 901, the base station 105 optionally transmits a feedback resource indication to the user equipment. The feedback resource indication information is configured to indicate specific resources of a particular component carrier for particular feedback for a particular sidelink channel transmission. For example, the base station 105 transmits a control message including feedback resource indication, as described with reference to FIGS. 4 and 5. To illustrate, a transmitter (e.g., transmit processor 220/TX MIMO processor 230 or transmitter 434) of the base station 105 transmits a HARQ resource indication via wireless radios 1101a-t and antennas 234a-t for a particular transmission between two UEs.

The wireless communication device (e.g., such as UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIGS. 4 and 5.

In a first aspect, the wireless communication device further determines a component carrier, bandwidth part (BWP), resource pool, or a combination thereof, for the HARQ feedback for the sidelink carrier aggregation on the other particular component carrier, wherein the feedback resource indication identifies the determined component carrier, bandwidth part (BWP), resource pool, or a combination thereof.

In a second aspect, alone or in combination with the first aspect, the feedback resource indication information comprises a HARQ resource indication information, and the wireless communication device further generates the HARQ resource indication information.

In a third aspect, alone or in combination with one or more of the above aspects, the feedback resource indication comprises a HARQ resource indication, and the wireless communication device further generates the HARQ resource indication.

Accordingly, wireless communication devices may perform enhanced feedback reporting for sidelink carrier aggregation operations. By performing enhanced feedback reporting for sidelink carrier aggregation operations throughput may be increased and latency and errors may be reduced by reducing or avoiding collisions in feedback reporting transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a wireless communication device, a sidelink shared channel transmission via a first component carrier;
determining a feedback resource indication based on hybrid automatic repeat request (HARQ) resource indication information stored at the wireless communication device and based on the first component carrier of the sidelink shared channel transmission, wherein the feedback resource indication identifies a set of feedback resources in a slot of a second component carrier; and
transmitting, by the wireless communication device, a sidelink channel feedback transmission in a sidelink channel feedback transmission resource via the second component carrier different from the first component carrier, the sidelink channel feedback transmission resource determined based on the feedback resource indication, and the sidelink channel feedback transmission indicates feedback data for the sidelink shared channel transmission.

2. The method of claim 1, further comprising:
determining, by the wireless communication device, the sidelink channel feedback transmission resource based on the HARQ resource indication, wherein the sidelink channel feedback transmission resource includes HARQ acknowledgement (HARQ-ACK) feedback information.

3. The method of claim 2, wherein the HARQ resource indication identifies the second component carrier and a set of HARQ feedback resources in the slot of the second component carrier.

4. The method of claim 1, further comprising:
generating, by the wireless communication device, feedback data based on the sidelink shared channel transmission, wherein the sidelink channel feedback transmission indicates the feedback data.

5. The method of claim 1, wherein the feedback resource indication comprises a HARQ resource indication, and further comprising:
obtaining, by the wireless communication device, the HARQ resource indication information from a network device, a user equipment, or from memory.

6. The method of claim 5, wherein the HARQ resource indication information comprises an index, wherein the index identifies physical sidelink feedback channel (PSFCH) resources on a PSFCH component carrier that are available for reporting HARQ feedback for physical sidelink shared channel (PSSCH) transmissions on another component carrier.

7. The method of claim 6, wherein the PSFCH resources on the PSFCH component carrier that are available for reporting the HARQ feedback are split into multiple groups, and wherein the HARQ resource indication points to an index number of one group of the multiple groups.

8. The method of claim 7, wherein a number of PSFCH resources of each group of the multiple groups is equal to a number of sub-channels of the first component carrier in one PSFCH period of the second component carrier or to a multiple thereof.

9. The method of claim 7, wherein the groups of the multiple groups comprise groups of resource block (RBs), and wherein the HARQ resource indication points to an index number of one group of RBs of the multiple groups of RBs.

10. The method of claim 1, further comprising:
receiving a second sidelink shared channel transmission via a third component carrier concurrently with the sidelink shared channel transmission; and
generating second feedback data for the second sidelink shared channel transmission, wherein the sidelink channel feedback transmission indicates the second feedback data for the second sidelink shared channel transmission, wherein the feedback resource indication is determined further based on the third component carrier of the second sidelink shared channel transmission.

11. The method of claim 1, wherein determining the feedback resource indication includes:
determining the feedback resource indication further based on transmission resources of the sidelink shared channel transmission.

12. The method of claim 1, wherein the HARQ resource indication information comprises index information including a plurality of index values each associated with different transmission resources for the second component carrier, and wherein determining the feedback resource indication includes:
identify a particular index of the HARQ resource indication information based on the first component carrier of the sidelink shared channel transmission and transmission resources of the sidelink shared channel transmission; and
determining the feedback resource indication based on the particular index.

13. An apparatus for wireless communication comprising:
a processor; and
a memory coupled to the processor, the memory storing instructions which when executed by the processor cause the processor to:
receive a sidelink shared channel transmission via a first component carrier;
determining a feedback resource indication based on hybrid automatic repeat request (HARQ)resource indication information stored at the memory and based on the first component carrier of the sidelink shared channel transmission, wherein the feedback resource indication identifies a set of feedback resources in a slot of a second component carrier; and
transmit a sidelink channel feedback transmission in a sidelink channel feedback transmission resource via the second component carrier different from the first component carrier, the sidelink channel feedback transmission resource determined based on the feedback resource indication, and the sidelink channel feedback transmission indicates feedback data for the sidelink shared channel transmission.

14. The apparatus of claim 13, wherein the HARQ resource indication information comprises an offset.

15. The apparatus of claim 14, wherein the offset indicates a first resource in a physical sidelink feedback channel (PSFCH) occasion on the second component carrier which is available for reporting HARQ feedback of a physical sidelink shared channel (PSSCH) transmission received on the first component carrier.

16. The apparatus of claim 14, wherein the HARQ resource indication information further includes offset information which indicates a first resource block (RB) in a physical sidelink feedback channel (PSFCH) occasion on a particular component carrier which is available for reporting HARQ of a physical sidelink shared channel (PSSCH)

transmission received on each component carrier, bandwidth part (BWP), or resource pool of the apparatus.

17. The apparatus of claim 13, wherein the HARQ resource indication information further includes resource information for reporting HARQ of a physical sidelink shared channel (PSSCH) transmission received on each component carrier configured for the apparatus, and where each component carrier is associated with a another component carrier for HARQ feedback.

18. The apparatus of claim 13, wherein the HARQ resource indication information indicates different resources for different cast types, and wherein the instructions when executed by the processor further cause the processor to:
  determine a cast type of the sidelink shared channel transmission; and
  determine the HARQ resource indication based on the cast type of the sidelink shared channel transmission.

19. The apparatus of claim 13, wherein the apparatus is configured with multiple resource pools, and wherein the HARQ resource indication information further indicates a particular resource pool of the multiple resource pools.

20. The apparatus of claim 19, wherein the HARQ resource indication information is configured to indicate HARQ resources for a plurality of resource pools of the multiple resource pools.

21. The apparatus of claim 13, wherein the apparatus is configured with multiple bandwidth parts (BWPs), and wherein the HARQ resource indication information further indicates a particular BWP of the multiple BWPs.

22. A non-transitory computer-readable medium storing instructions that, when executed by a processor, cause the processor to perform operations comprising:
  receiving, by a wireless communication device, a sidelink shared channel transmission via a first component carrier;
  determining a feedback resource indication based on hybrid automatic repeat request (HARQ)resource indication information stored at the wireless communication device and based on the first component carrier of the sidelink shared channel transmission, wherein the feedback resource indication identifies a set of feedback resources in a slot of a second component carrier; and
  transmitting, by the wireless communication device, a sidelink channel feedback transmission in a sidelink channel feedback transmission resource via the second component carrier different from the first component carrier, the sidelink channel feedback transmission resource determined based on the feedback resource indication, and the sidelink channel feedback transmission indicates feedback data for the sidelink shared channel transmission.

23. The non-transitory computer-readable medium of claim 22, wherein the instructions further cause the processor to perform operations comprising:
  receiving, by the wireless communication device, the HARQ resource indication information from a network device; and
  transmitting, by the wireless communication device, the HARQ resource indication information to a user equipment (UE), the feedback resource indication determined further based on the HARQ resource indication information.

24. The non-transitory computer-readable medium of claim 22, wherein the HARQ resource indication information indicates resource information for multiple cast types.

25. The non-transitory computer-readable medium of claim 22, wherein the sidelink channel feedback transmission comprises a physical sidelink feedback channel (PSFCH) transmission and includes HARQ bits associated with multiple physical sidelink shared channel (PSSCH) transmissions received from a particular UE.

26. An apparatus configured for wireless communication, the apparatus comprising:
  means for receiving a sidelink shared channel transmission via a first component carrier;
  means for determining a feedback resource indication based on hybrid automatic repeat request (HARQ) resource indication information stored at the apparatus and based on the first component carrier of the sidelink shared channel transmission, wherein the feedback resource indication identifies a set of feedback resources in a slot of a second component carrier; and
  means for transmitting a sidelink channel feedback transmission in a sidelink channel feedback transmission resource via the second component carrier different from the first component carrier, the sidelink channel feedback transmission resource determined based on the feedback resource indication, and the sidelink channel feedback transmission indicates feedback data for the sidelink shared channel transmission.

27. The apparatus of claim 26, wherein the feedback resource indication comprises a HARQ resource indication, and further comprising:
  means for determining the HARQ resource indication based on a HARQ resource indication information, wherein the HARQ resource indication information indicates resource information for a group of aggregated component carriers.

28. The apparatus of claim 27, wherein the HARQ resource indication information indicates resource information for individual pairs of aggregated component carriers, and wherein the HARQ resource indication information indicates first resource information for a first pair of aggregated component carriers, second resource information for a second pair of aggregated component carriers, and third resource information for a third pair of aggregated component carriers.

29. The apparatus of claim 26, wherein the sidelink channel feedback transmission includes HARQ feedback information, and wherein HARQ feedback for sidelink transmissions is managed across carriers, and wherein each physical sidelink shared channel (PSSCH) transmission on a particular component carrier maps to a single physical sidelink feedback channel (PSFCH) resource on another component carrier.

30. The apparatus of claim 26, wherein the sidelink channel feedback transmission includes HARQ feedback information, wherein HARQ feedback for sidelink transmissions is managed across carriers, and wherein HARQ information bits associated with multiple physical sidelink shared channel (PSSCH) transmissions from a same transmitter for the first component carrier, bandwidth part (BWP), or resource pool are mapped to a single physical sidelink feedback channel (PSFCH) resource on the second component carrier, BWP, or resource pool.

* * * * *